INVENTOR
ERIC STEWART WILSON

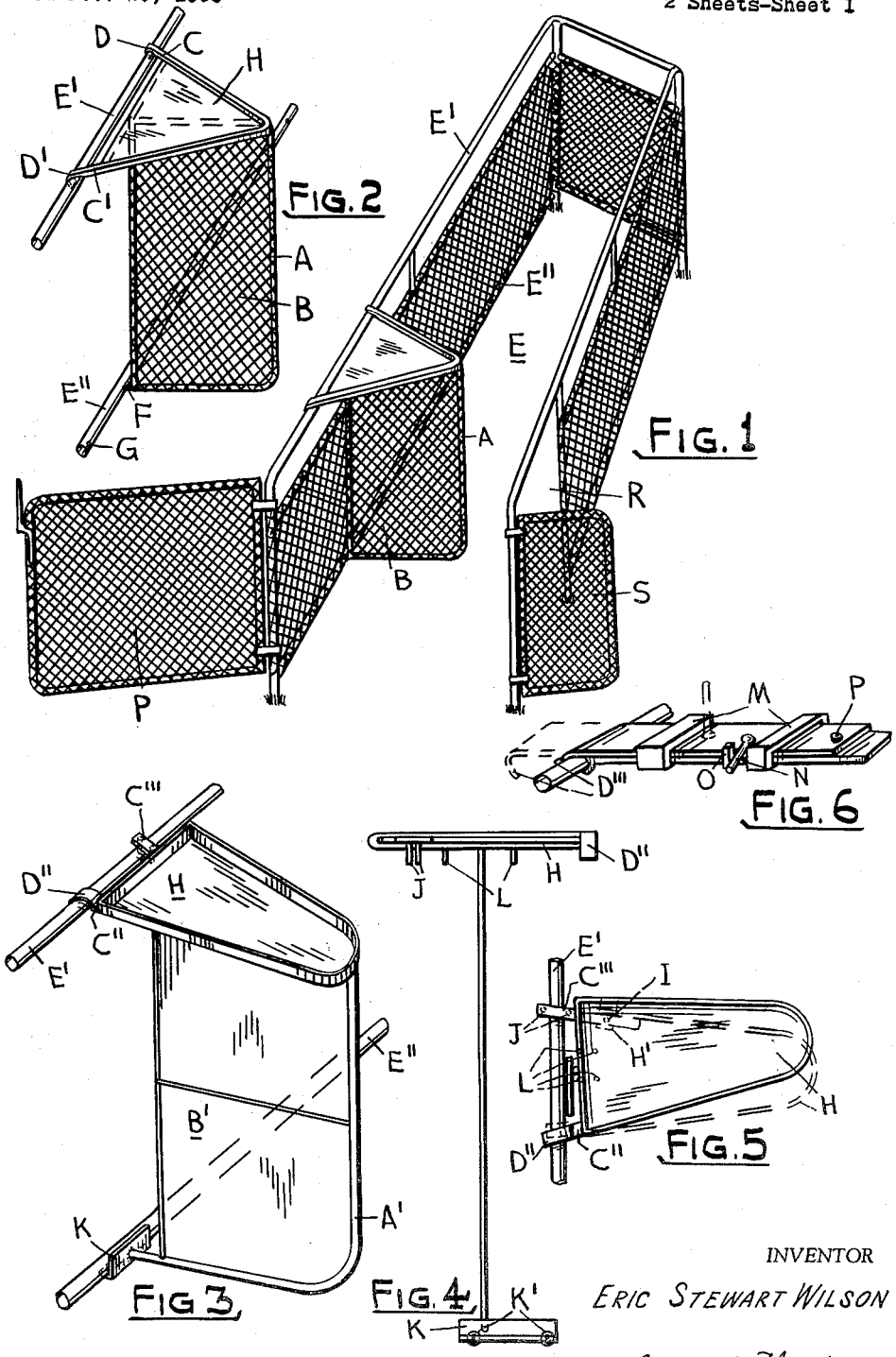

United States Patent Office 3,017,860
Patented Jan. 23, 1962

3,017,860
BARRIER FOR USE IN AN ANIMAL RACE
OR PEN
Eric Stewart Wilson, "Cross Hills," Kimbolton,
New Zealand
Filed Dec. 29, 1958, Ser. No. 783,543
Claims priority, application New Zealand Jan. 10, 1958
10 Claims. (Cl. 119—99)

This invention is concerned with a novel form of barrier for use in an animal race or small pen, more especially on sheep farms, and an improvement in the race or pen for such barrier.

At present for drenching and inoculating operations sheep or lambs are hard to confine in handling, and often an animal is unintentionally roughly handled before it is finally caught by the farmer. This results in damaging the animal.

It is, therefore, an object of the present invention to provide a novel form of barrier that may be so mounted in the race or small pen that the animal, when held by the hand, has a corner provided into which the animal may back and so be easily confined for treatment, and, as the treatment of animals in the pen or race progresses, such barrier may be moved along the race or pen.

A further object is to provide an improvement in the race or pen whereby the barrier may be incorporated as a temporary gate for an exit opening in a side of the race or pen.

Generally, the invention covers a movable barrier for an animal race or small pen, the barrier comprising a frame of a size whereby it may extend across the race or pen a necessary distance to provide a space between the adjacent side of the frame and the side of the race or pen for an animal to just pass through, a covering extending over the area enclosed by the frame, at least one arm extending from near the adjacent side of the frame and adapted at its other end for slidable attachment to the other side of the pen or race, and means for locking it at a position along such side of the pen or race.

In further describing the invention reference will be made hereinafter to the accompanying drawing, in which:

FIGURE 1 is a perspective view of a race with the barrier mounted therein;

FIGURE 2 is a similar view of the barrier on larger scale;

FIGURE 3 is a similar view to FIGURE 2 but of a modified form of barrier;

FIGURE 4 is an elevation of the barrier;

FIGURE 5 is a plan thereof locked to a race fence rail, and the dash outline represents a loose position of the barrier on the rail as later referred to;

FIGURE 6 is an oblique view of a locking means;

Figure 7:
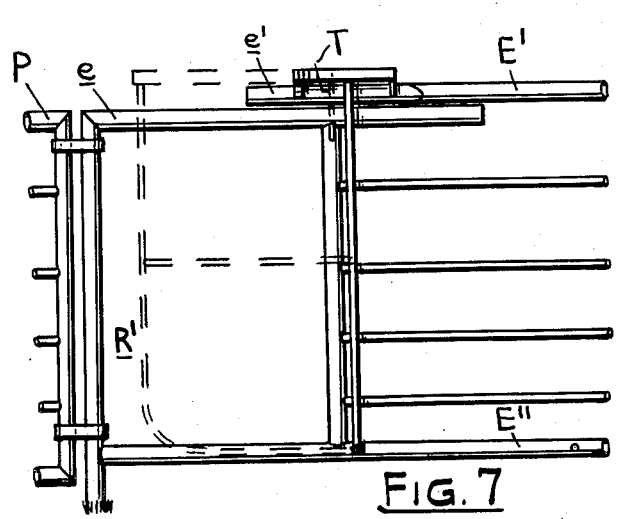
FIGURE 7 is an elevation on a pen or race side showing an exit opening therein and the barrier in its extended position.

In more fully describing one form of the invention according to FIG. 2 the barrier frame A is of a rectangular shape and tubular nature, with its covering being of wire mesh B suitably attached to the frame. This rectangular frame A is disposed with its longer sides vertical.

The side arms C, C' are also of a tubular nature, and attached by welding to the top outer corners of the frame so that the arms extend diagonally out from the corner as braces. The other ends of the bracing arms C, C' are adapted by being curved round as hooks D, D' for fitting upon a rail E' or top member of that side of the pen or closed race E. A tray H is mounted between arms C and C' and is attached as by welding to the upper portion of the barrier frame for additional support.

A means for locking the frame A at a desired position along the race or pen includes a protruding stud F at the bottom inner corner of the frame adapted for insertion into any one of a number of spaced holes G provided in the bottom rail E" or member of that side of the race or pen.

In a modified form according to FIGS. 3 and 4, the barrier frame A' is of the rectangular shape and tubular nature but with its covering as a sheetmetal panel B'. Of its side arms, one C" is attached by welding to an inner corner of a sheetmetal upstand or tray H and the other arm C''' is adjustably attached to the other inner corner thereof. The arm C" extends diagonally out from the top and has its outer end disposed in a configuration such as a hook D" for mounting to the top rail E'. The other arm C''' is adjustably attached as by a pivot I to the tray H, and at its outer end has two spaced depending pins J for mounting the top rail therebetween. This arm C''' is pivotally mounted to a cross member H' mounted on the underside of the upstand or tray H.

At the bottom inner corner of the frame A' on a stub end is fixed at foot K, for mounting on the bottom rail E", in the form of a piece of angle iron to provide sufficient clearance under the bottom rail to allow for any difference in overall heights between the top rail E' and the bottom rail E". This foot has end slots, and small rollers K' located therein are journalled on cross pins; these rollers are to facilitate a smooth action when the barrier is shifted along the rail E". Depending from the top tray H are four further pins L, a pair at each side of the frame A', and spaced so that the barrier can be hung on a fence out of the way when not required in the race itself.

A modified means for clamping an arm to the top rail E' is shown in FIG. 6 and comprises the hook D''', having its inner end slidably mounted on the arm in guides M and a locking pin N pivoted to the hook's inner end between the guides whereby the pin may be turned down to be held between a guide and a stud O and so lock the hook to the rail E'. The inner end of hook D''' has a stopping member P which abuts against the innermost guide M to prevent hook D''' from accidentally being pulled out from guides M.

Figure 8:
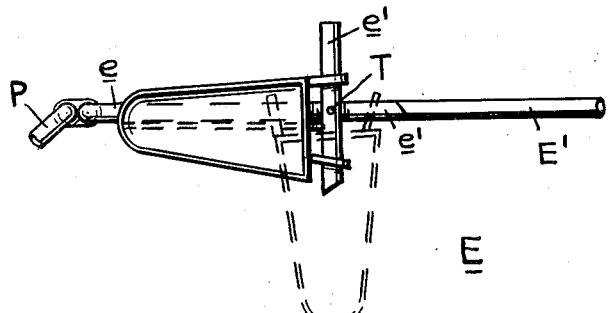
FIGURE 8 is a plan of the pen or race with the barrier closing such exit opening.

As shown in FIGS 7 and 8, the pen or race E has a main drafting gate P and has an exit opening R in a side, with either a secondary gate S but preferably a head portion e which extends from a corner post and is welded below the end of the top rail E'. This rail E' is, however, scarfed to provide a free section e', which is pivoted to the side by a drop pin T. The barrier is mounted on this section to close the side opening R'.

In use, with the barrier mounted on the rail or section e and with the animals moved into the race through the main gate P and past the barrier swung in line with the race side, the barrier is swung out and the animal nearest the barrier is caught and backs into the resultant corner formed by the barrier and the respective side of the race; it can be treated, as by drenching or inoculating, and then directed past the barrier through the narrowed space, or otherwise. As the animals in the race get progressively less, the barrier is gradually moved along the rails. Each treated animal may then be released through the side opening R, or R' as the case may be, into a larger pen or yard. The section e' forming a continuity of the top rail E' will not interfere with normal sliding of the barrier thereof, and the scarf cut will ensure proper aligning of the section to the rail. With the modified barrier the member H' holds the self-locking arm C''' square. In this position the barrier can be pulled forwards toward a sheep to any desired distance, and will automatically lock in that position by the two pins J in the end of the locking arm C''' taking up a diagonal position on the top rail E', as shown in drawing FIGURE 5, when pressure such as sheep being backed into it is applied. This locking arm will disengage when the barrier is pulled forward again. To slide the barrier back the full length of the drenching race, the operator, with one hand, holds the locking arm in the square position, as indicated by dash-outline in drawing FIGURE 5. Naturally the barrier will move backwards a little when pressure is applied to it, but the length of the angle-iron foot K and its rigid attachment to the frame A' will keep the movement to a minimum. The top upstand or tray H is provided to hold drenching equipment on the barrier in a handy position. The size of the barrier naturally depends on that of the pen or race; for instance, in a race 3 ft. wide a barrier of about 1 ft. 9 ins. wide will be satisfactory.

The barrier can be mounted in a race having tubular members, and preferably near one end is provided with a drafting gate, as shown in drawing FIGURE 1, so that the animals can be released into a larger pen or yard.

Having now described my invention, what I claim is:

1. A movable barrier for an animal race or pen comprising at least one vertical fence-like structure having top and bottom rails, an outwardly projecting barrier frame adjustably and movably mounted on said rails, a tray-like mounting means supporting the upper portion of said barrier frame, said tray-like mounting means having positioning means mounted thereon selectively engaging said top rail, and a supporting member mounted on the lower portion of said barrier frame in movable contact with said bottom rail whereby said barrier frame is movably and adjustably positioned along said fence-like structure.

2. A movable barrier according to claim 1 in which said fence-like structure comprises a further vertical fence-like structure disposed opposite said one fence-like structure and said barrier extends from said one fence-like structure toward said further fence-like structure a distance necessary to provide a space between said further fence-like structure and said barrier for an animal to just pass through.

3. A movable barrier according to claim 1 wherein said positioning means consist of arms having one end mounted on said tray-like mounting means and the other end formed into hooks for slidable engagement with said top rail.

4. A movable barrier according to claim 1 wherein said positioning means comprise one arm having one end mounted on said tray-like mounting means and the other end formed into a hook, and another arm having one end mounted on said tray-like mounting means and the other end having pins disposed in a downward direction therefrom, the other end of each arm engaging said top rail in slidable contact.

5. A movable barrier according to claim 4 in which the one end of said other arm is pivotally mounted to said tray-like mounting means.

6. A movable barrrier according to claim 1 wherein said positioning means comprise one arm having one end mounted on said tray-like mounting means and the other end formed into a hook, for slidable contact with said top rail, and another arm having one end mounted on said tray-like mounting means, guides mounted on said other arm, a hook member slidably mounted within said guides for slidable and adjustable engagement with said top rail, and locking means disposed on said other arm for locking said hook member on said top rail.

7. A movable barrier according to claim 1 wherein said bottom rail has spaced holes arranged therein and said supporting member consists of a protruding stud for insertion into any one of said spaced holes to adjustably position said movable barrier along said fence-like structure.

8. A movable barrier according to claim 1 wherein said supporting member consists of a foot in the form of a piece of angle iron, slots disposed in said angle iron, and rollers journalled on cross pins mounted in said slots whereby said foot movably and smoothly engages said bottom rail as said barrier is moved.

9. A movable barrier according to claim 1 wherein said barrier frame has a membrane-like covering thereover.

10. A movable barrier according to claim 1 wherein said fence-like structure has an opening therein, said top rail has a section adjacent said opening which is pivoted whereby when said movable barrier is moved onto said section, said movable barrier can be pivotallly moved to close said opening.

References Cited in the file of this patent

UNITED STATES PATENTS

| | | |
|---|---|---|
| 382,707 | Keating | May 15, 1888 |
| 1,436,897 | Novak | Nov. 28, 1922 |
| 2,691,359 | Antiss et al. | Oct. 12, 1954 |
| 2,773,476 | Thomas | Dec. 11, 1956 |
| 2,815,001 | Hanson | Dec. 3, 1957 |